United States Patent
Murakami et al.

(10) Patent No.: US 6,813,827 B2
(45) Date of Patent: Nov. 9, 2004

(54) MANUFACTURING SYSTEM FOR SMALL PLANING WATERCRAFTS

(75) Inventors: Masatoshi Murakami, Hamamatsu (JP); Sadayuki Kobayashi, Hamamatsu (JP); Takanori Suzuki, Hamamatsu (JP); Yasuo Torii, Hamamatsu (JP); Atsushi Takahashi, Hamamatsu (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 120 days.

(21) Appl. No.: 10/308,383

(22) Filed: Dec. 3, 2002

(65) Prior Publication Data

US 2003/0101579 A1 Jun. 5, 2003

(30) Foreign Application Priority Data

Dec. 4, 2001 (JP) .................................. 2001-370391

(51) Int. Cl.⁷ .................. B23P 21/00; B21D 39/03; B63B 3/00
(52) U.S. Cl. ..................... 29/783; 29/430; 114/65 R
(58) Field of Search .................. 29/783, 771, 430, 29/426, 460, 469, 33 P; 114/39.1, 65 R; 405/195.1

(56) References Cited

U.S. PATENT DOCUMENTS 4,018,180 A * 4/1977 Yoshida ............... 114/65 R

FOREIGN PATENT DOCUMENTS

DE          2920791       * 12/1980
JP       2002230085       *  8/2002

* cited by examiner

Primary Examiner—John C. Hong
(74) Attorney, Agent, or Firm—Rankin, Hill, Porter & Clark LLP (57) ABSTRACT

A small planing watercraft manufacturing system includes a hull loading station, an engine mounting station, an adhesive applying station, a deck assembling station, a clamping station, a curing station and a watercraft unloading station that are disposed in a closed loop-shaped travel path in the order named with the hull loading station and the watercraft unloading station located adjacent to each other. By virtue of the closed loop-shaped travel path, the manufacturing system requires only a small space for installation thereof, can be constructed at a relatively low equipment cost and is able to produce small planing watercrafts with increased efficiencies.

9 Claims, 9 Drawing Sheets

MANUFACTURING SYSTEM FOR SMALL PLANING WATERCRAFTS

FIELD OF THE INVENTION

The present invention relates to a manufacturing system for small planing watercrafts, wherein after an engine is mounted on a hull, a deck is attached by adhesive bonding to the hull to thereby produce a small planing watercraft.

BACKGROUND OF THE INVENTION

Small planing watercrafts of the type including a jet pump mounted on a rear portion of the hull are known. The jet pump is driven by an engine to pump up water from the bottom of the hull and subsequently eject the pumped water rearward to thereby propel the watercraft forward. A conventional manufacturing system used for producing such planing watercrafts will be described with reference to FIG. 9.

Figure 9:
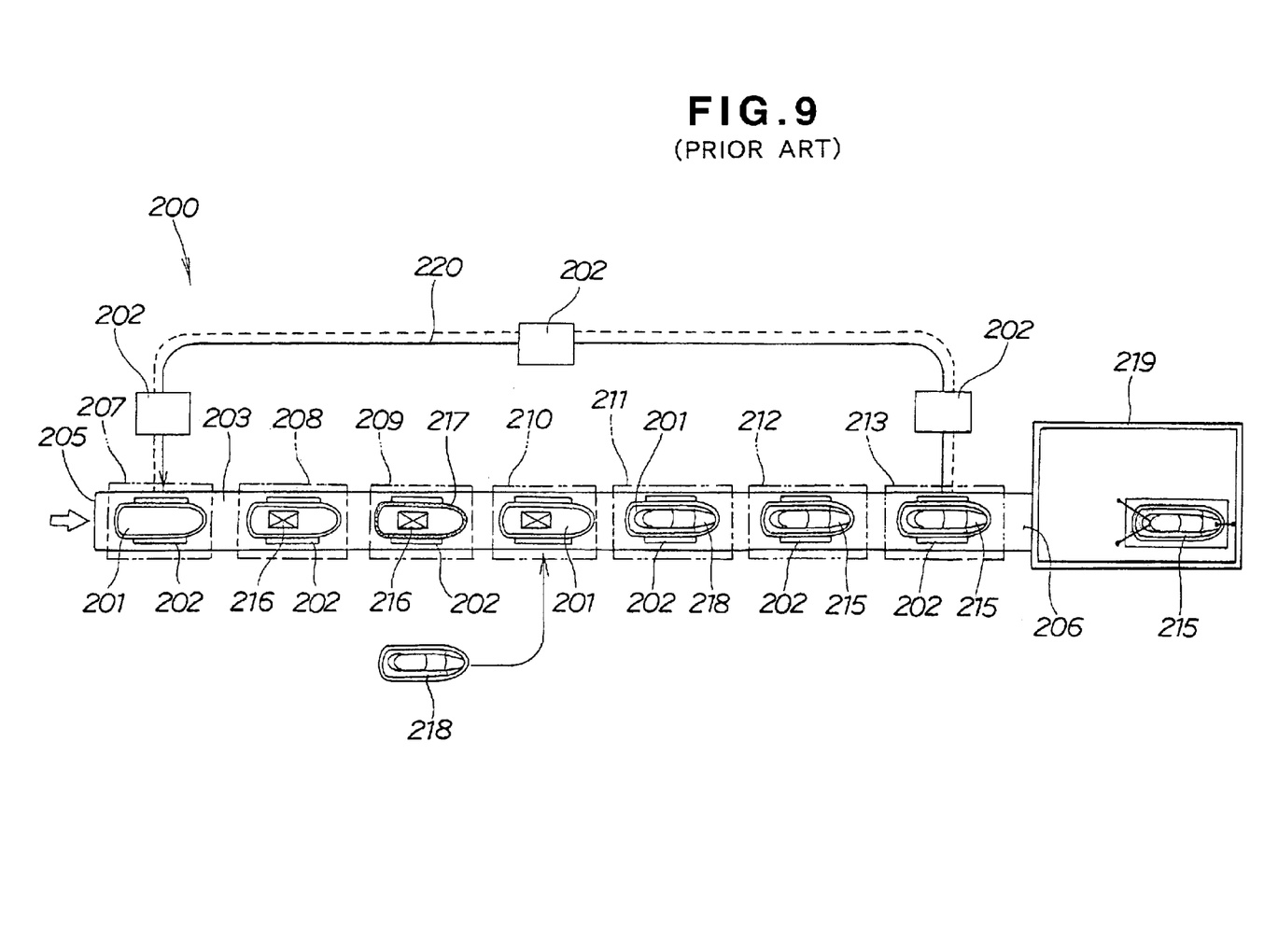
FIG. 9 is a schematic plan view showing the general arrangement of a conventional small planing watercraft manufacturing system.

As shown in FIG. 9, the conventional small planing watercraft manufacturing system 200 has a straight or rectilinear travel path 203 along which carriers 202 travel with hulls 201 carried respectively thereon. In the straight travel path 203, a hull loading station 207, an engine mounting station 208, an adhesive applying station 209, a deck assembling station 210, a clamping station 211, a curing station 212 and a watercraft unloading station 213 are disposed in the order named as viewed from a supply end 205 toward a discharge end 206 of the travel path 203.

For assembly of a small planing watercraft 215, a hull 201 is placed or loaded on each of the carriers 207 at the loading station 207. The carrier 202 with the hull 201 supported thereon is then transferred along the travel path 203 to the engine mounting station 208. At the engine mounting station 208, an engine 216 is mounted on the hull 202. The hull 202 carried on the hull carrier 202 is further advanced along the travel path 203 to the adhesive applying station 209 where an adhesive 217 is applied to a bonding portion of the hull 201. Thereafter, the hull 201 is transferred by the carrier 202 to the deck assembling station 210.

At the deck assembling station 210, a deck 218, which is standing by on the right side of the deck assembling station 210 with parts or accessories mounted thereon, is placed on the hull 201. Thereafter, at the clamping station 211, the hull 201 and the deck 218 are damped together so that respective bonding surfaces of the hull 201 and deck 218 are closely fitted with each other via the adhesive 217. The hull 201 and deck 218 thus clamped are fed to the curing station 212 where the adhesive 217 is caused to cure to thereby firmly joining the hull 201 and the deck 218 together. A complete small planing watercraft 215 is thus produced.

The complete small planing watercraft 215 is transferred to the unloading station 213 where the watercraft 215 is discharged to an inspection area 219 which is provided contiguously with the discharge end 206 of the travel path 203. At the inspection area 219, the complete small planing watercraft 215 is tested for water jet performance. If the test results are satisfactory, the small planing watercraft 215 will be forwarded to a subsequent processing station (packaging station, for example) for storage or shipment.

In the conventional manufacturing system 200, the carrier 202 becomes empty when the small planing watercraft 215 is discharged from the unloading station 213. In preparation for the next loading process, the empty carrier 202 is returned to the loading station 207 through a carrier return path 220. The foregoing processes are repeated until a desired number of small planing watercrafts 215 are produced.

Since all of the stations 207–213 are disposed in the straight travel path 203, the entire length of the travel path 203 is relatively large. The conventional manufacturing system 200 having such long travel path requires a relatively large space for installation thereof.

Additionally, since the carrier 202 becomes empty at the unloading station 213 which is located at one end (discharge end 206) of the straight travel path 203, the carrier return path 220 extending from the one end to the other end (supply end 203) of the straight travel path 203 must be provided to return the empty carrier 202 to the loading station 207 which is located at the supply end 205 of the straight travel path 203. To insure continuous processing of the watercrafts 215 along the stations 207–213, a certain large number of empty carriers must be present on the carrier return path 220. With this requirement, a total number of carriers 202 used on the conventional manufacturing system 200 is relatively large. Due to the necessity of the carrier return path 220 and use of an increased number of carriers 202, equipment cost of the conventional manufacturing system 200 is considerably large.

In order to reduce the equipment cost, an attempt may be made to reduce the number of carriers 202 used in the manufacturing system 200. However, attempted reduction in number of the carriers 202 will give rise to a problem that, due to an insufficient number of empty carriers returned to the loading station 207, the productivity of the manufacturing system is considerably reduced.

SUMMARY OF THE INVENTION

It is, accordingly, an object of the present invention to provide a manufacturing system for small planing watercrafts, which requires a relatively small space for installation thereof, can be constructed at a relatively low equipment cost and is able to produce small planing watercrafts with increased efficiencies.

To achieve the foregoing object, according to the present invention, there is provided a manufacturing system for small planing watercrafts, comprising a plurality of hull carriers, a closed loop-shaped travel path along which the hull carriers travel in succession, a hull loading station for loading a hull on each of the hull carriers, an engine mounting station for mounting an engine onto the hull, an adhesive applying station for applying an adhesive to a bonding portion of the hull, a deck assembling station for assembling a deck onto the hull such that a bonding portion of the deck comes face to face with the bonding portion of the hull, a clamping station for clamping together the respective bonding portions of the hull and deck with the adhesive held therebetween, a curing station for causing the adhesive to cure, with the bonding portions being kept clamped, to thereby firmly join the bonding portions to form a complete small planing watercraft, and a watercraft unloading station for unloading the complete small planing watercraft from the hull carrier. The hull loading station, engine mounting station, adhesive applying station, deck assembling station, clamping station, curing station and watercraft unloading station are disposed in the closed loop-shaped travel path in the order named with the hull loading station and the watercraft unloading station located adjacent to each other.

Since all of the processing stations are disposed in succession along the length of the closed loop-shaped travel, the manufacturing system is smaller in length than the conventional manufacturing system having a straight travel path. Additionally, since the hull loading station and the watercraft unloading station are located adjacent to each other, it is possible to return an empty hull carrier from the watercraft unloading station to the hull loading station in a short time. This will increase the productivity of the manufacturing system. Use of the closed loop-shaped travel path makes it unnecessary to provide a separate carrier return path as done in the conventional manufacturing system. Adjacent arrangement of the hull loading station and the watercraft unloading station that can be realized by the use of the closed loop-shaped travel path is able to reduce the total number of hull carriers used in the manufacturing system. Thus, the manufacturing system can, therefore, be constructed at a relatively low cost.

The manufacturing system may further include a plurality of deck carriers, a second closed loop-shaped travel path along which the deck carriers travel in succession, a deck loading station for loading a deck on each of the deck carriers, a deck parts assembling station for assembling deck parts onto the deck, and a deck unloading station for unloading the deck from the deck carrier before the deck is assembled on the hull at the deck assembling station. The deck loading station, parts assembling station and deck unloading station are disposed in the second closed loop-shaped travel path in the order named with the deck unloading station located next to the deck assembling station.

Due to the use of the closed loop-shaped second travel path, the deck loading station and the deck unloading station can be located adjacent to each other. This arrangement enables return of an empty deck carrier from the deck unloading station to the deck loading station in a short time, which will increase the productivity of the manufacturing system. In addition, since the travel path and the second travel path are arranged with the deck loading station located next to the deck assembling station, it is possible to convey the decks to the deck unloading station in synchronism with the conveyance of the hull to the deck assembling station. This arrangement further increases the productivity of the manufacturing system.

In one preferred form of the present invention, the curing station includes at least one pair of curing units disposed in direct opposite relation across the travel path for receiving a preassembled watercraft composed of the hull and the deck being clamped together at the respective bonding portions, so as to cure the adhesive held between the bonding portions, and a turntable located on the travel path and disposed centrally between the pair of curing units for rotary motion through an angle of 90 degrees to ensure that the preassembled small planing watercraft is allowed to be supplied into or discharged from either one of the curing units. Since the curing units are arranged crosswise the travel path, the curing station is able to reduce the length of the travel path. Additionally, since one of the curing units is disposed inside the loop-shaped travel path, the space of the manufacturing system can be used efficiently.

Preferably, the curing units each include a generally U-shaped frame for accommodating therein a major part of the preassembled small planing watercraft with the watercraft carried on the hull carrier, a gate that can be opened and closed to allow the watercraft to be introduced into or discharged from the curing unit with a fore-end or a rear-end of the preassembled watercraft directed forward, and a hot air blower mounted on the frame and the gate for directing hot air onto the bonding potions of the hull and deck being clamped, so as to heat the adhesive to cure.

The deck carrier may include a deck reversing means for reversing the deck while supporting the deck in a horizontal plane on the deck carrier. The deck reversing means preferably comprises a first grip member for gripping a fore-end portion of the deck, and a second grip member for gripping a rear-end portion of the deck, the first and second grip members being rotatably mounted on two opposed vertical support members of the deck carrier such that the grip members are rotatable about a common horizontal axis extending between the vertical support members. The deck reversing means enables a human operator to assemble deck parts or accessories on both of a front side and a back side of the deck without being forced to take uneasy postures.

The manufacturing system may further comprise a transfer machine disposed between the deck unloading station and the deck assembling station for unloading the deck from the deck carrier at the deck unloading station, then moving the deck from the deck unloading station to the deck assembling station, and finally placing the deck on the hull carried on the hull carrier at the deck assembling station. The transfer machine thus provided lowers the work load on the human operator.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

Figure 1:
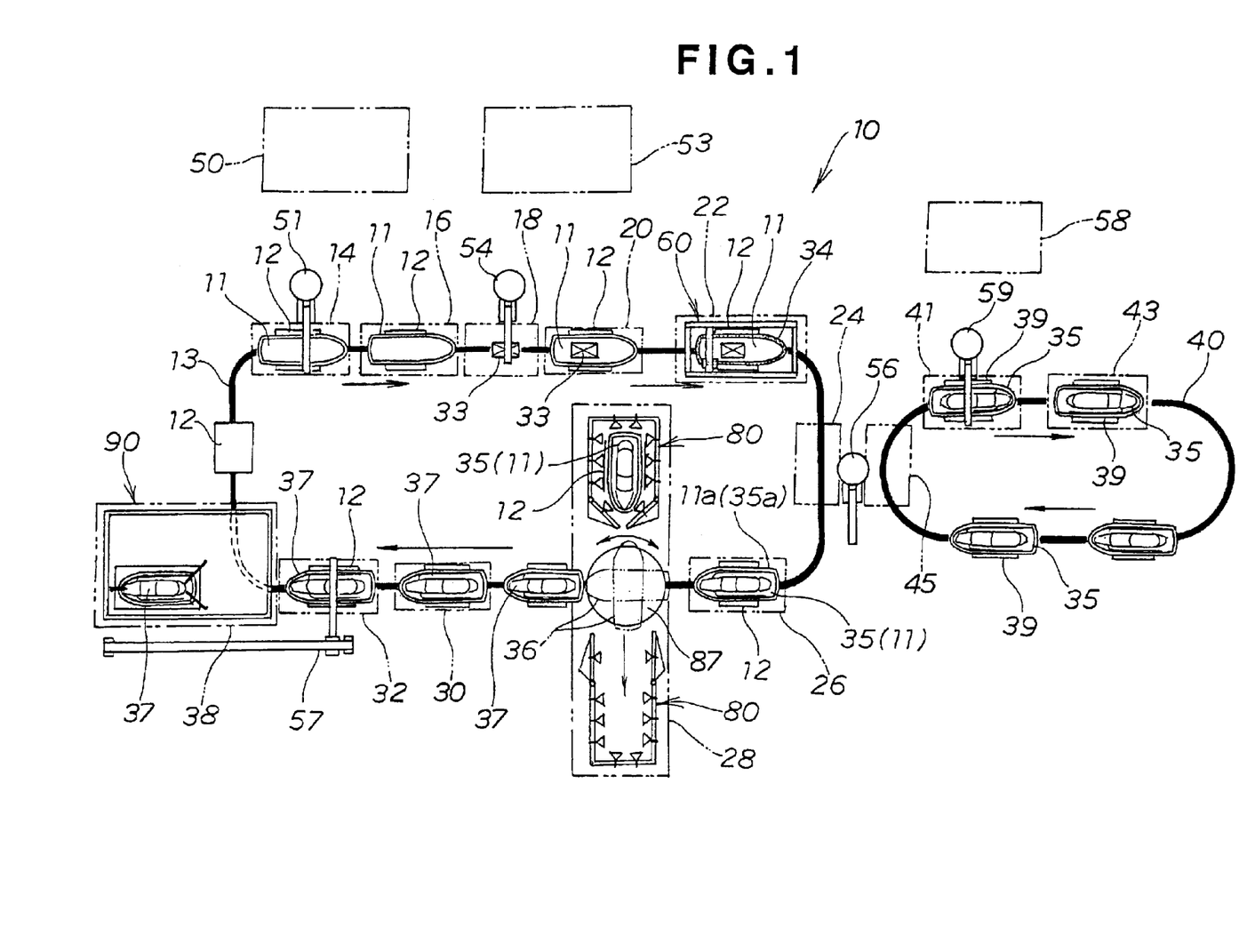
FIG. 1 is a schematic plan view showing the general arrangement of a small planing watercraft manufacturing system according to an embodiment of the present invention.

Referring now to the drawings and FIG. 1 in particular, there is shown the general arrangement of a manufacturing system 10 for small planing watercrafts according to an embodiment of the present invention. The small planing watercraft manufacturing system 10 has a carrier travel path 13 of a closed loop shape along which hull carriers 12 travel in succession with or without a hull 11 carried thereon. The manufacturing system 12 also includes a hull loading station 14, a first parts assembling station 16, an engine mounting station 18, a second part assembling station 20, an adhesive applying station 22, a deck assembling station 24, a clamping station 26, a curing station 28, a third parts assembling station 30 and a watercraft unloading station 32 that are disposed in the carrier travel path 13 in the order named with the hull loading station 14 and the watercraft unloading station 32 located adjacent to each other.

The hull loading station 14 forms a first station in the manufacturing system 10 when viewed in the direction of travel of the hull carriers 12 indicated by the arrows shown in FIG. 1. At the hull loading station 14, a hull 11 is loaded on the hull carrier 12. The first parts assembling station 16 is disposed immediately downstream of the hull loading station 14, and at this station 16, parts or accessories, such as operation cables (not shown), are assembled on the hull 11 while the hull 11 is supported on the hull carrier 12. The engine mounting station 18 is disposed immediately downstream of the first parts assembling station 16, and at this station 18, an engine 33 is mounted on the hull 11. The second parts assembling station 20 is disposed immediately downstream of the engine mounting station 33. At the second parts assembling station 20, other parts or accessories, such as fuel hoses (not shown), are assembled on the hull 11 that is carried on the hull carrier 12.

The adhesive applying station 22 is disposed immediately downstream of the second parts assembling station 20, and at this station 22, an adhesive 34 is applied to a bonding portion 11a (FIG. 3) of the hull 11 while the hull 11 is carried on the hull carrier 12. The deck assembling station 24 is disposed immediately downstream of the adhesive applying station 22. At the deck assembling station 24, a deck 35 is assembled on the hull 11 so that a bonding portion 35a (FIG. 4) of the deck 35 comes face to face with the bonding portion 11a of the hull 11 (which has been coated with the adhesive 34). The clamping station 26 is disposed immediately downstream of the deck assembling station 24, and at this station 26, the bonding portions 11a, 35a (FIG. 5B) of the hull 11 and deck 35 are tightly clamped together. The curing station 28 is disposed immediately downstream of the clamping station 26. At the curing station 28, the adhesive 34 is caused to cure while the bonding portions 11a, 35a (FIG. 5B) are kept clamped. Thus, the hull 11 and the deck 35 are firmly joined together at the bonding portions 11a, 35a to thereby form a complete small planing watercraft 37.

The third parts assembling station 30 is disposed immediately downstream of the curing station 28. At the third parts assembling station 30, other parts or accessories, such as seats (not shown), are assembled on the complete small planing watercraft 37, thereby finishing the assembly of the small planing watercraft 37. The finished small planing watercraft 37 is unloaded from the hull carrier 12 at the watercraft unloading station 32 which is disposed immediately downstream of the third parts assembling station 30. In the Illustrated embodiment, the finished small planing watercraft 37 is fed from the watercraft unloading station 32 into an inspection area 38. The inspection area 38 is contiguous to a forward end (left end in FIG. 1) of the watercraft unloading station 32 when viewed from the above but it is provided at a higher level in overlapping relation to the travel path 13 so that the hull carrier 12 can pass below the inspection area 38 as it moves from the watercraft unloading station 32 to the hull loading station 14. The inspection area 38 may be provided inside or outside the closed loop-shaped travel path 13 to avoid interference with the travel path 13.

The manufacturing system 10 also has a second travel path 40 of a closed loop shape along which deck carriers 39 travel in succession with or without a deck 35 carried thereon. The closed loop-shaped second travel path 40 comes close to the first-mentioned loop-shaped travel path (hereinafter referred to, for brevity, as "first travel path") 13 at the deck assembling station 24. A deck assembling station 41, a deck parts assembling station 43 and a deck unloading station 45 are disposed in the second travel path 40 in the order named as viewed in the travel direction of the deck 35 indicated by the arrows shown in FIG. 1 such that the deck unloading station 45 in the second travel path 40 is located in lateral juxtaposition with the deck assembling station 24 in the first travel path 13.

The deck loading station 41 forms a first station among those 41, 43, 45 disposed in the second travel path 40. At the deck loading station 41, a deck 35 is carried on the deck carrier 39. The deck parts assembling station 43 is disposed immediately downstream of the deck loading station 41, and at this station 43, deck parts or accessories (not shown) are assembled on the deck 35 while the deck 35 is carried on the deck carrier 39. The deck unloading station 45 forms the last station among those 41, 43, 45 disposed in the second travel path 40. At the deck unloading station 45, the deck 35 assembled with the deck parts or accessories is unloaded from the deck carrier 39 before it is assembled or placed on the hull 11 which has been placed at the deck assembling station 24.

As shown in FIG. 1, a portion of the first travel path 13, which extends from the hull loading station 14 successively through the first parts assembling station 16, engine mounting station 18 and second parts assembling station 20 to the adhesive applying station 22, is straight or rectilinear. The first travel path 13 curves rightward as it extends from the adhesive applying station 22 through the deck assembling station 25 to the clamping station 26. Similarly, a portion of the first travel path 13, which extends from the clamping station 26 successively through the curing station 28 and the third parts assembling station 30 to the watercraft unloading station 32, is straight or rectilinear. The first travel path 13 curves rightward as it extends from the watercraft unloading station 32 to the hull loading station 14.

A hull stock area 50 indicated by phantom lines shown in FIG. 1 is provided in the vicinity of the hull loading station 14 for temporarily storing hulls 11 before they are assembled with the deck 35 to form small planing watercrafts. A first transfer apparatus or machine 51 is disposed between the hull stock area 50 and the hull loading station 14. The first transfer machine 51 is used to pick up one hull 11 at a time from the hull stock area 50, transfer the hull 11 to the hull loading station 14 and load or place the hull 11 onto the hull carrier 12 at the hull loading station 14.

Similarly, an engine stock area 53 indicated by phantom lines in FIG. 1 is provided in the vicinity of the engine mounting station 18 for temporarily storing engines 33 before they are assembled on the hulls 11. A second transfer apparatus or machine 54 is disposed between the engine stock area 53 and the engine mounting station 18. The second transfer machine 53 is used to pick up one engine 33 at a time from the engine stock area 53, transfer the engine 33 to the engine mounting station 18 and place the engine 33 onto the hull 11 at the engine mounting station 18.

A third transfer apparatus or machine 56 is disposed between the deck assembling station 24 in the first travel path 13 and the deck unloading station 45 in the second travel path 40. The third transfer apparatus 56 is used to unload the deck 35 from the deck carrier 39 at the deck unloading station 45, transfer or move the unloaded deck 35 from the unloading station 45 to the deck assembling station 24 and place the deck 35 onto the hull 11 supported on the hull carrier 12 at the deck assembling station 24.

A crane 57 is provided in the vicinity of the watercraft unloading station 32 and the inspection area 38, so as to move the finished small planing watercraft 37 from the watercraft unloading station 32 to a test position 90 provided within the inspection area 37.

The second travel path 40 is straight or rectilinear as it extends from the deck loading station 41 to the deck parts assembling station 43. From the deck parts assembling station 43 to the deck unloading station 45, the second travel path 40 first curves rightward, then extends straightforward and finally curves rightward again. The second travel path 40, as it extends from the deck unloading station 45 to the deck loading station 41, takes a curvilinear course.

A deck stock area 58 indicated by phantom lines shown in FIG. 1 is provided in the vicinity of the deck loading station 41 for temporarily storing decks 35 before they are assembled with the hulls 11 to form small planing watercrafts. A fourth transfer machine or apparatus 59 is disposed between the deck stock area 58 and the deck loading station 41. The fourth transfer apparatus 59 is used to pick up one deck 35 at a time from the deck stock area 58, transfer the deck 35 to the deck loading station 41 and load or place the deck 35 onto the deck carrier 39 at the deck loading station 41.

Operation of the small planing watercraft manufacturing system 10 will be described in greater detail with reference to FIGS. 1 through 8. Using the first transfer apparatus 51 shown in FIG. 1, a hull 11 is picked up from the hull stock area 50, the transferred to the hull loading station 14 and finally placed or loaded on one of the hull carriers 12 which has been transferred to the hull loading station 14. The hull carrier 12 with the hull 11 carried thereon is advanced to the first parts assembling station. After parts or accessories, such as operation cables (not shown), are assembled on the hull 11 at the first parts assembling station 16, the hull 11 carried on the hull carrier 12 is transferred to the engine mounting station 18.

Figure 2:
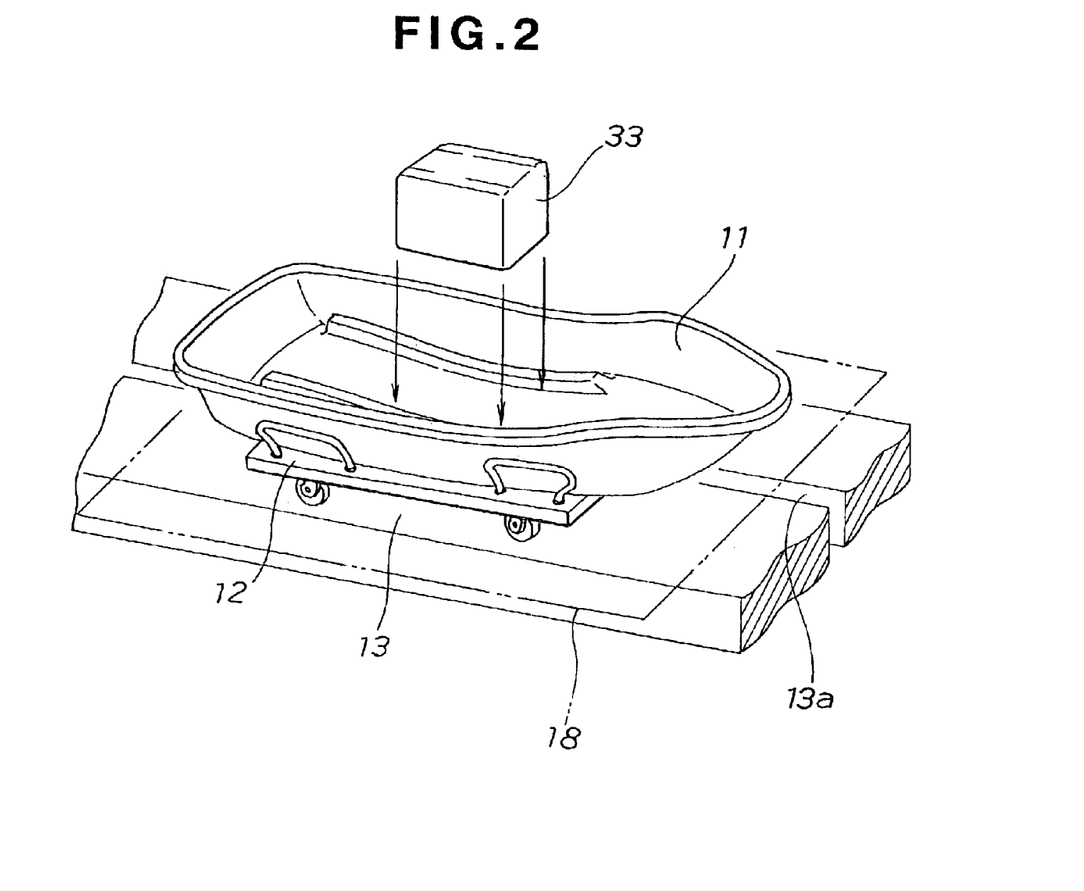
FIG. 2 is a perspective view illustrative of the manner in which an engine is mounted on a hull at an engine mounting station of the small planing watercraft manufacturing system.

While the hull carrier 12 with the hull 11 carried thereon is at rest at the engine mounting station 18, one engine 33 is picked up from the engine stock area 53, then transferred to the engine mounting station 18 and finally placed or mounted on the hull 11 by using the second transfer apparatus 54. As shown in FIG. 2, a guide groove 13a extends across the engine mounting station 18. The guide groove 13a is continuous and forms the closed loop-shaped travel path 13 (FIG. 1) along which the hull carriers 12 are fed in succession. Each hull carrier 12 has a leg 12a (FIG. 5A) extending downward from the undersurface of the hull carrier 12 and slidably received in the guide groove 13a. Though not shown, a suitable conveyor means such as a conveyor chain may be installed in the guide groove 13a in which instance the respective legs 12a of the hull carriers 12 are connected to the conveyor chain at longitudinal intervals.

After the engine 33 is mounted on the hull 11 at the engine mounting station 18, the hull 11 is transferred by the hull carrier 12 to the second parts assembling station 20. At the second parts assembling station 20, other parts or accessories, such as fuel hoses (not shown), are assembled on the hull 11. The hull 11 carried on the hull carrier 12 is thereafter advanced to the adhesive applying station 22.

Figure 3:
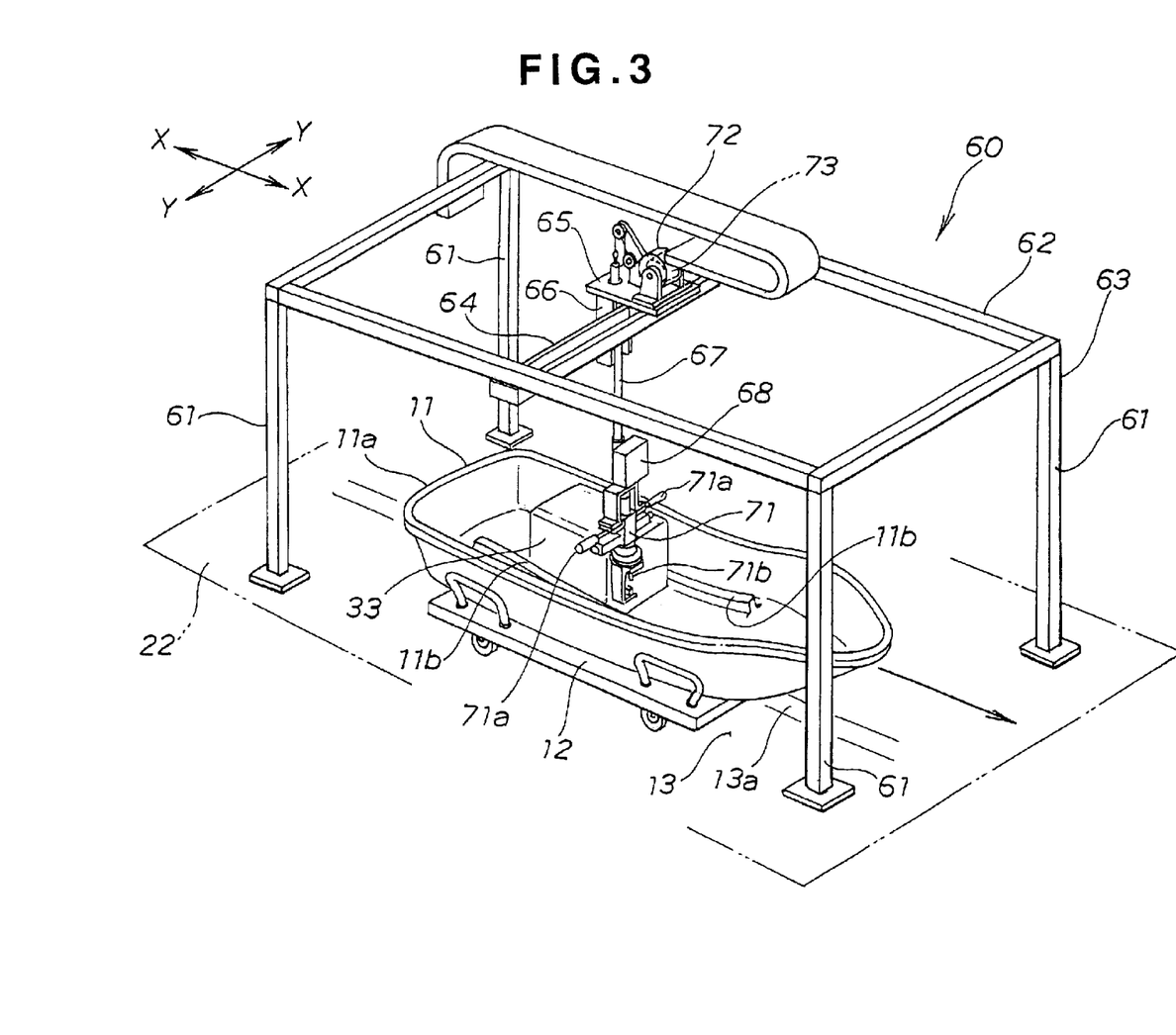
FIG. 3 is a perspective view showing the manner in which an adhesive is applied to a bonding portion of the hull at the adhesive applying station of the small planing watercraft manufacturing system.

The adhesive applying station 22, as shown in FIG. 3, includes an adhesive applying apparatus 60 used for applying an adhesive 34 (FIG. 1) to a bonding portion 11a of the hull 11. The adhesive applying apparatus 60 comprises a rectangular roof frame 42 supported at respective corners by four vertical support columns 61 such that a longitudinal centerline of the rectangular roof frame 42 lies directly above a portion of the guide groove 13a extending across the adhesive applying station 22. The rectangular roof frame 62 has a movable crossbeam 64 mounted such that crossbeam 64 is movable relative to the roof frame 62 in a longitudinal direction of the roof frame 62 (X—X direction in FIG. 3). The adhesive applying apparatus 60 also includes a carriage 65 mounted on the crossbeam 64 for movement in a Y—Y direction along the crossbeam 64, and an adhesive applicator or gun 71 mounted on the lower end of a vertical support rod 67. A control box 68 is also mounted on a lower end portion of the support rod 67. The support rod 67 is guided for vertical movement by a channel-shaped guide member 66 extending downward from the carriage 65. An upper end of the support rod 67 connected via a wire cable (not designated) to a hanger unit 72 which is equipped with a counterbalance 73 for canceling out the weights of the adhesive gun 71 and control box 68.

The adhesive gun 71 has a pair of grips 71a, 71a adapted to be gripped by a human operator (not shown) for manipulation of the adhesive gun 71 in such a way that a nozzle 71b of the adhesive gun 71 moves along the bonding portion 11a of the hull 11. In the illustrated embodiment, the bonding portion 11a is formed by a peripheral edge at an open upper end of the hull 11. The bonding portion may include other parts of the hull 11, such as longitudinal ribs 11b formed on the bottom wall of the hull 11. The adhesive applying apparatus 60 of the foregoing construction is actuated in appropriate manner such that the adhesive 34 (FIG. 1) is uniformly applied on the bonding portion 11a of the hull 11.

Figure 4:
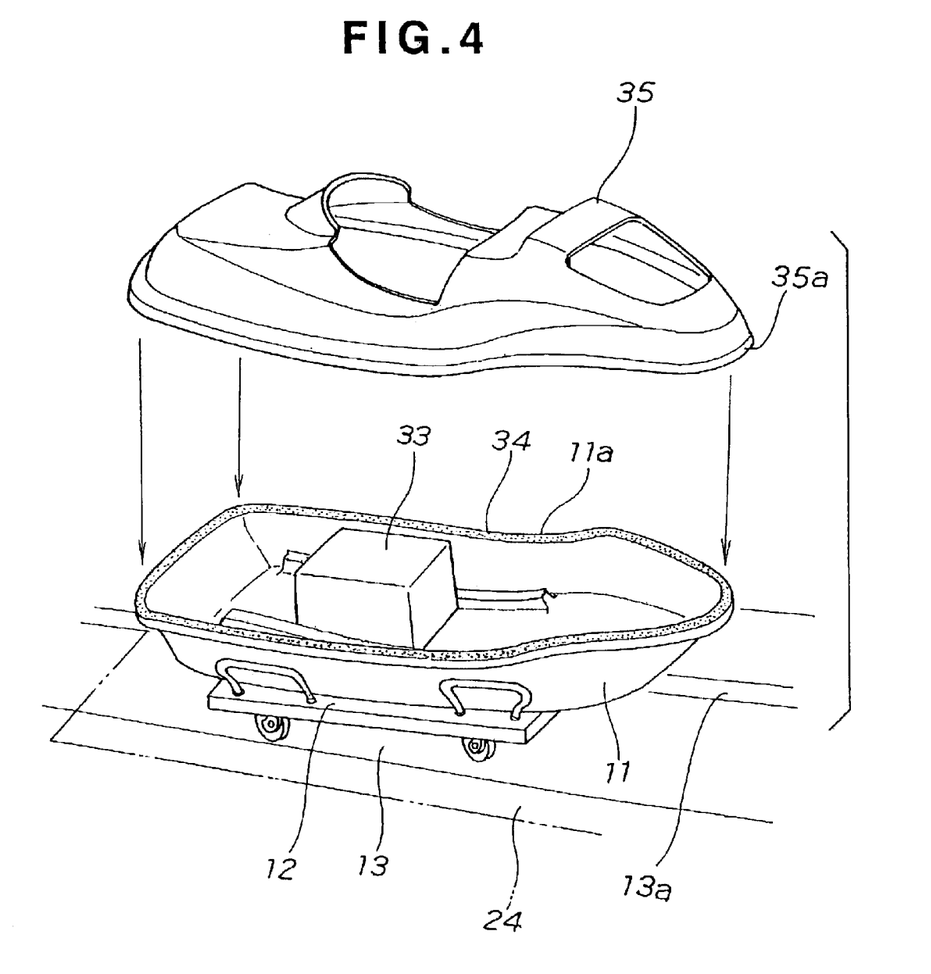
FIG. 4 is a perspective view illustrative of the manner in which a deck is placed on the hull at a deck assembling station of the small planing watercraft manufacturing system.

After the bonding portion 11a of the hull 11 is coated with the adhesive 34 at the adhesive applying station 22, the hull 11 is transferred by the hull carrier 12 to the deck assembling station 24. In timed relation to the arrival of the adhesive-coated hull 11 at the deck assembling station 24, a deck 35 carried on one deck carrier 39 reaches the deck unloading station 45. Then, by using the third transfer apparatus, the deck 35 is unloaded from the deck carrier 39 at the deck unloading station, then transferred to the deck assembling station 24 and finally assembled or placed on the adhesive-coated hull 11 at the deck assembling station 24 such that a bonding portion (peripheral edge) 35a of the deck 35 overlies the adhesive-coated bonding portion 11a (peripheral edge) of the hull 11, as shown in FIG. 4. The hull 11 thus assembled with the deck 35 is subsequently transported by the hull carrier 12 to the clamping station 26.

Figure 5A:
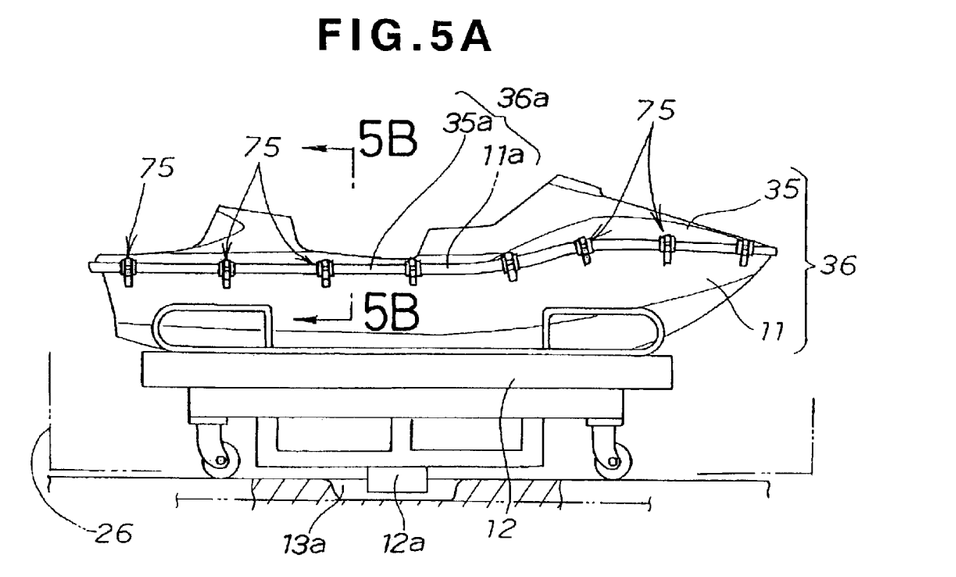
FIG. 5A is a side view showing the manner in which the deck and the hull are clamped together at a clamping station of the small planing watercraft manufacturing system.
Figure 5B:
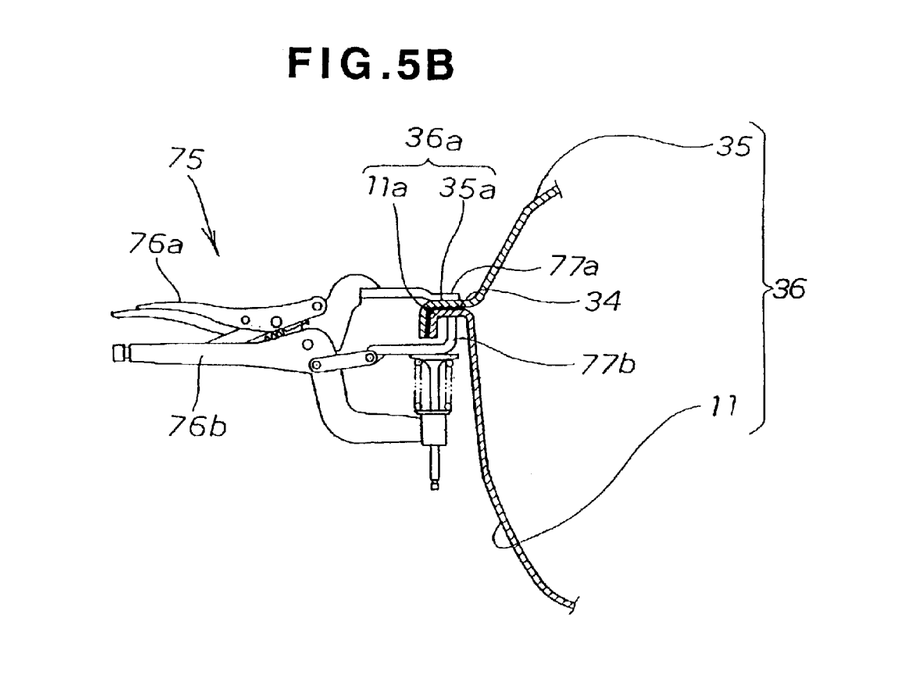
FIG. 5B is an enlarged cross-sectional view taken along the line 5B—5B of FIG. 5A.

As shown in FIG. 5A, at the clamping station 5A, the respective bonding portions (peripheral edges) 11a, 35a of the hull 11 and deck 35 are tightly clamped together by means of a plurality of clamp tools 75. The bonding portions 11a, 35a thus clamped together form a peripheral edge 36a of a temporarily assembled small planing watercraft 36. As shown in FIG. 5B, each of the clamp tools 75 has a pair of clamp jaws 77a, 77b for clamping the peripheral edge 36a of the watercraft 36 and a pair of grip portions 76a, 76b for being gripped by a human operator. When the grip portions 76a, 76b are gripped together, the clamp jaws 77a, 77b firmly grip the bonding portions 11a, 35a of the hull 11 and deck 36, which form the peripheral edge 36a of the preassembled watercraft 36. With this clamping, the bonding portions 11a, 35a are closely fitted together via a film of the adhesive 34. The preassembled watercraft 36 with its peripheral portion 36a clamped by the clamp tools 75 is then transferred by the hull carrier 12 to the curing station 28.

As shown in FIG. 1, the curing station 28 includes two curing units 80, 80 disposed in direct opposite relation across the loop-shaped first travel path 13, and a turntable 87 disposed centrally between the curing units 80, 80, the turntable 87 being located on the travel path 13. The preassembled watercraft 36 which has been transferred to the curing station 28 is turned through an angle of 90 degrees by means of the turntable 87 so that a longitudinal centerline (not shown) of the preassembled watercraft 36 is aligned with a common longitudinal centerline (not shown) of the inside and outside curing units 80, 80. The preassembled watercraft 36 is then fed into one of the curing units 80 (inside curing unit in the illustrated embodiment) for the purpose of curing the adhesive 34 (FIG. 5B) held between the bonding portions 11a, 35a of the hull 11 and deck 35.

Since the curing station 28 has two curing units 80, 80, it is possible to improve the efficiency of the curing process by using the curing units 80, 80 alternately. The number of curing units 80 provided in the curing station 28 is not limited to two as in the illustrated embodiment. Rather, two or more pairs of inside and outside curing units may be provided in the curing station 80 in view of an intended capacity of the manufacturing system 10.

Unlike the curing station 28 of the present invention, the conventional curing station 212 (FIG. 9) is comprised of an elongated curing furnace extending on and along the straight travel path 203. A preassembled watercraft carried on the hull carrier 202 passes through the curing furnace while the bonding portions of the hull 201 and deck 218 are kept clamped together. During that time, the adhesive 217 held between he bonding portions is caused to cure so that the hull 201 and the deck 218 are firmly joined together at a peripheral edge of the preassembled watercraft. Since the curing process requires a relatively long time as compared to other processes, the curing furnace disposed on and along straight travel path 203 is necessarily made longer than the other stations. The conventional manufacturing system 200 having such long curing furnace is, therefore, considerably large in length.

In the case of the curing station 28 of the present invention, since the curing units 80, 80 are arranged crosswise the first travel path 13, a length of the travel path 13 that is occupied by the curing station 28 is considerably smaller than the length of the travel path 203 occupied by the curing furnace of the conventional curing station 212 (FIG. 1). This means that the curing units 80 arranged crosswise the travel path 13 contribute to the reduction of the overall length of the manufacturing system 10. In addition, the curing unit 80 disposed inside the loop-shaped travel path 13 improves the efficiency of use of the space inside the manufacturing system 10. Furthermore, two curing units 80 that can be used alternately will increase the efficiency of the curing process.

Figure 6A:
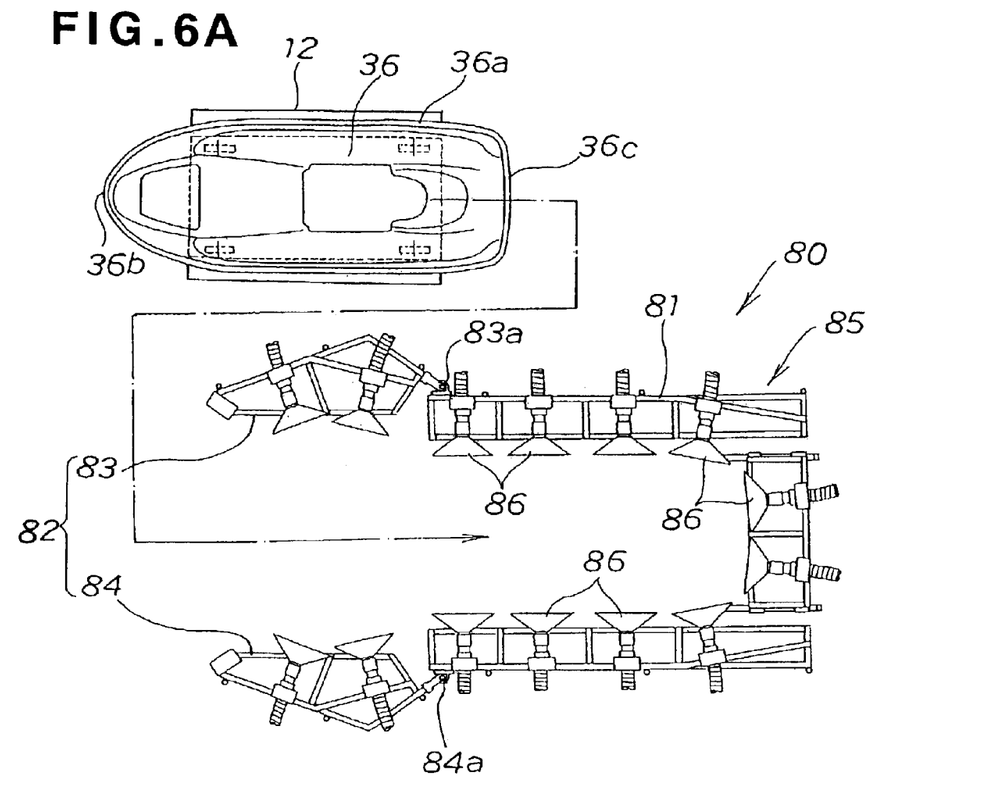
FIGS. 6A and 6B are schematic plan views illustrative of the manner in which the adhesive is cured to firmly join the hull and the deck together at the curing station of the small planing watercraft manufacturing system.
Figure 6B:
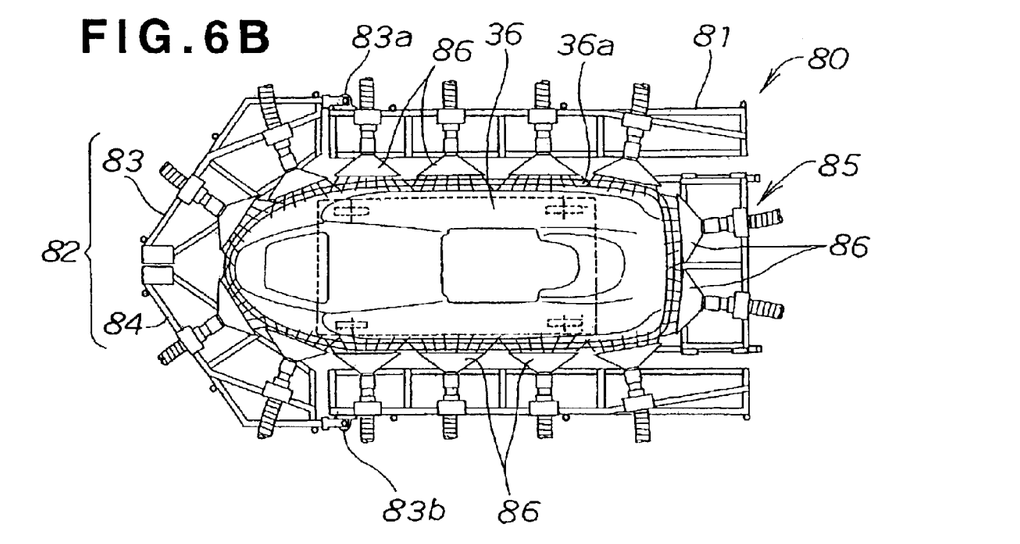

As shown in FIG. 6A, each of the curing units 80 includes a generally U-shaped frame 81 for accommodating therein a major part of the preassembled watercraft 36 while being carried on the hull carrier 12, a gate 82 that can be opened and closed to allow the watercraft 36 to be introduced into or discharged from the curing unit 80 with the bow 36b or the stern 36c directed forward, and a hot air blower 85 mounted on the frame 81 and the gate 82 so as to direct hot air therefrom onto the peripheral edge 36a of the preassembled watercraft 36. The hot air blower 85 has a plurality of nozzles 86 arranged along the full circumference of the curing unit 80 such that the peripheral edge 36a of the preassembled watercraft 36 is heated uniformly by streams of hot air ejected from the individual nozzles 86 of the hot air blower 85.

The gate 82 is a hinged gate composed of two gate members 83 and 84 pivotally connected by hinges 83a, 84a to opposite fore-ends of the U-shaped frame 81. The gate members 83, 84 are normally disposed in an open position shown in FIG. 5A. After the preassembled watercraft 36 supported on the hull carrier 12 has been introduced into a space defined by the U-shaped frame 81, the two gate members 83, 84 are brought to a closed position shown in FIG. 6B. The watercraft 36 is now fully received inside the curing unit 80 in such a condition that the nozzles 86 of the hot air blower 85 are distributed uniformly alongside the peripheral edge 36a of the preassembled watercraft 36. Then, the hot air blower 85 is driven to direct hot air from the nozzles 86 onto the peripheral edge 36a of the preassembled watercraft 36 to thereby heat the adhesive 34 (FIG. 5B) until the adhesive 34 is caused to cure. By thus curing the adhesive 34, the hull 11 and the deck 35 are firmly joined together along the peripheral edge 36a of the preassembled watercraft 36, and the preassembled watercraft 36 is converted into a complete watercraft 37.

The watercraft 36 with the hull 11 and deck 35 firmly joined together (now, converted into the complete watercraft 37) is subsequently transferred to the third parts assembling station 30, as shown in FIG. 1. At the third parts assembling station 30, remaining parts or accessories, such as seats (not shown), are assembled on the watercraft 37 to thereby finish the manufacturing process. The finished complete watercraft 37 is, thereafter, advanced to the watercraft unloading station 32 from which the watercraft 37 is delivered by the crane 57 to the inspection area 38. In this instance, the watercraft 37 is unloaded from the hull carrier 12. The hull carrier 12 is thereafter returned to the hull loading station 51. In this instance, since the watercraft unloading station 32 and the hull loading station 14 are located adjacent to each other, return of the empty hull carrier 12 to the hull loading station 14 is achieved in a short period of time.

Figure 7:
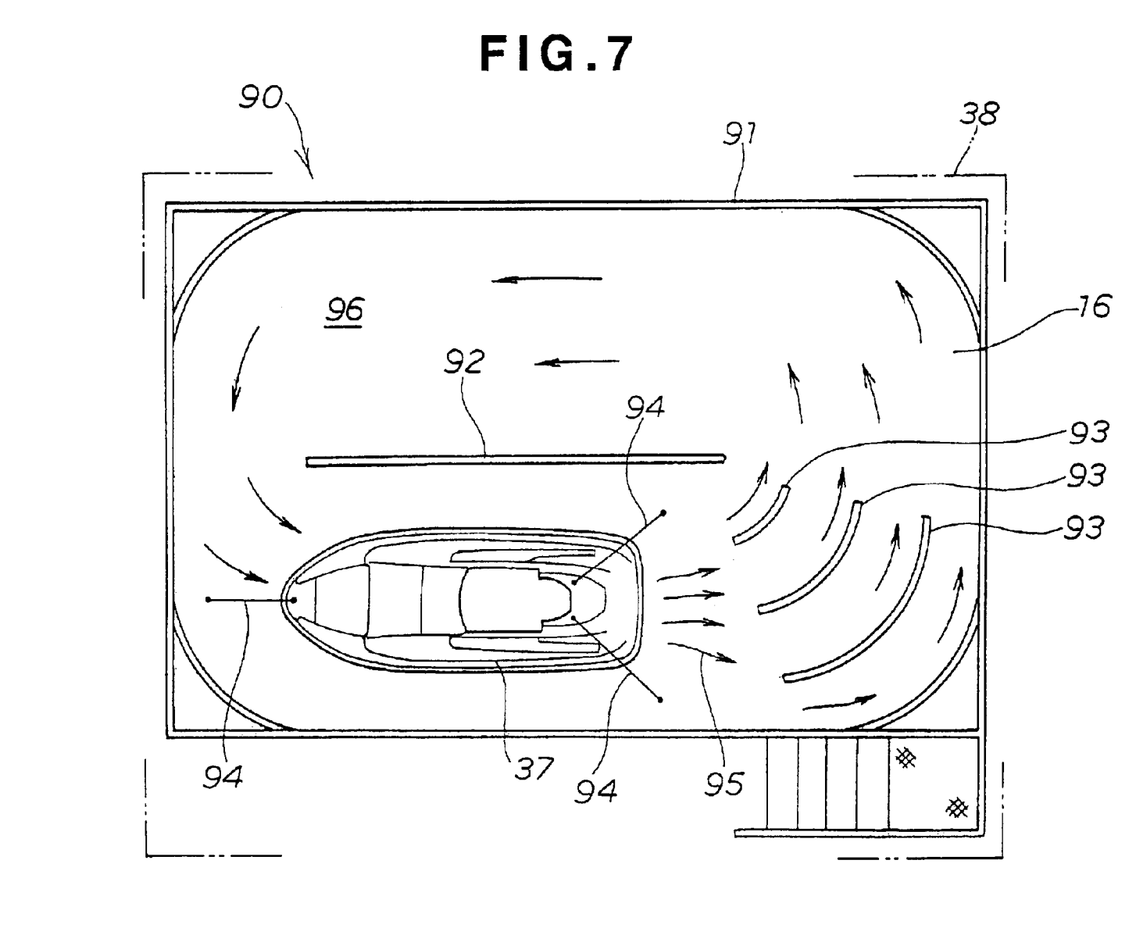
FIG. 7 is a schematic plan view of an inspection area in which a complete small planing watercraft is tested for water jet performance.

The inspection area 90, as shown in FIG. 7, has a water pool 91 of elongated rectangular shape in which water 96 is held for securing the water jet performance test effected on the watercraft 37. The water pool 91 has a longitudinal partition wall 92 and a plurality of curved flow guide plates 93 arranged in such a manner that, when the watercraft 37 while being anchored in a test position set on one side of the partition wall 92 is driven to eject a water jet 95 backward, the water jet 95 will enter between the curved flow guide plates 93 and thus be guided by the flow guide plates 93 to flow in a direction indicted by the arrow shown in FIG. 7. The thus guided water jet 95 produces a stream of pool water 96 flowing from one side to the other side of the partition wall 92 and subsequently returning to the one side. By thus circulating the pool water 96 smoothly, the water jet performance of the watercraft 37 can be checked with high inspection accuracies. Reference numeral 94 shown in FIG. 7 denotes anchor ropes 94 used for securing the watercraft 37 in the test position during the water jet performance test.

Figure 8:
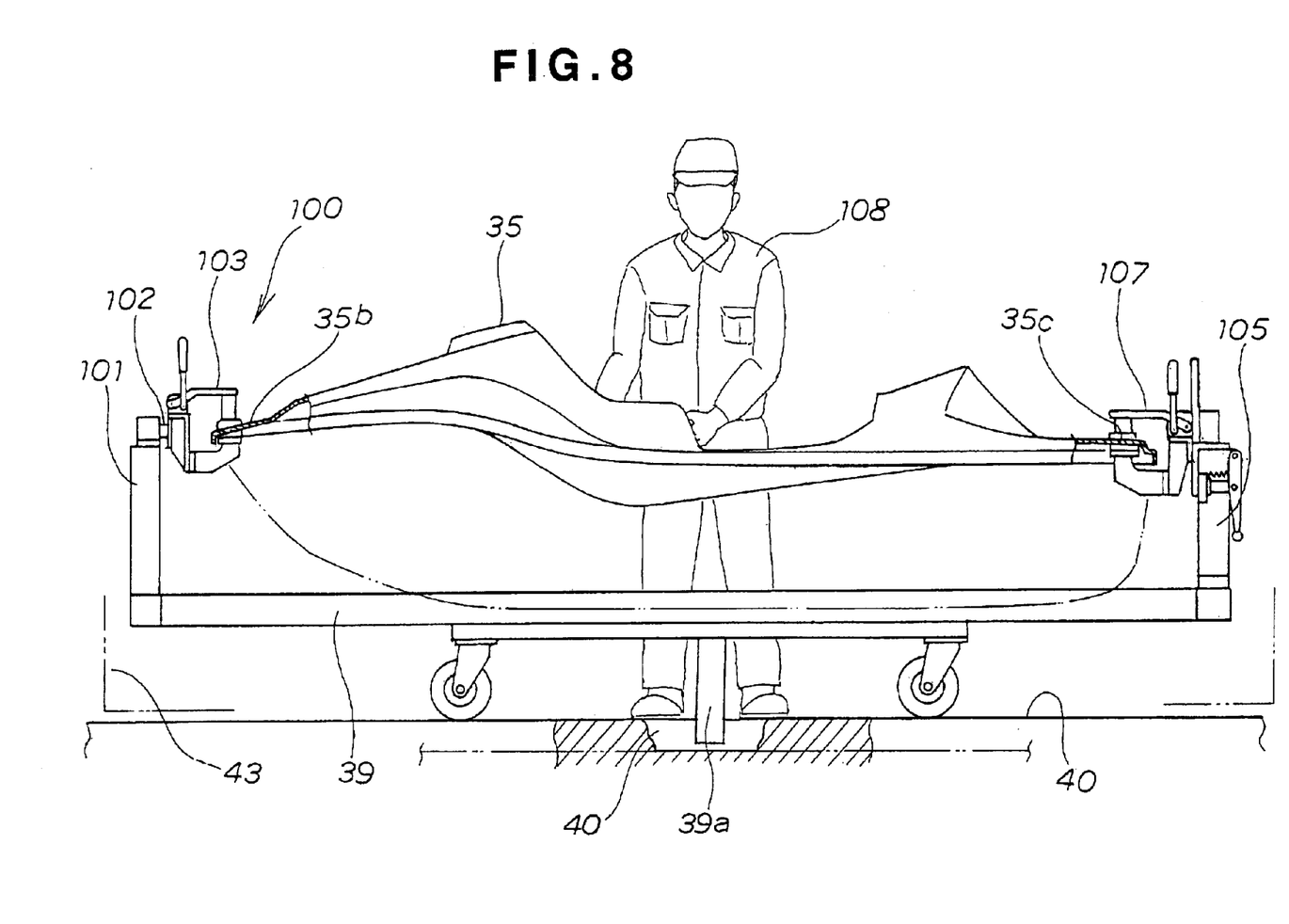
FIG. 8 is a side view, with parts cut-away for clarity, showing the manner in which parts or accessories are assembled on the deck by a human operator at a parts assembling station disposed in a second carrier travel path.

FIG. 8 shows the deck carrier 39 as it is in the deck parts assembling station 43. As shown in this figure, the deck carrier 39 has a deck reversing means 100 for reversing the deck 35 while supporting the deck 35 in a horizontal position on the deck carrier 39. The deck reversing means 100 comprises a front grip member 103 for gripping a fore-end portion 35b of the deck 35, and a rear grip member 107 for gripping a rear-end portion 35c of the deck 35. The front grip member 103 is rotatably mounted on a horizontal support shaft 102 projecting inwardly from an upper end portion of a front vertical support member 101. Similarly, the rear grip member 107 is rotatably mounted on a horizontal support shaft (not shown) projecting inwardly from an upper end portion of a rear vertical support member 105, the non-illustrated support shaft being aligned with the support shaft 102. The front and rear grip members 103, 107 can be locked against rotation relative to the horizontal support shafts 102 at at least two positions diametrically opposite to each other. They can be locked at any desired angular position relative to the axes of the support shafts 102.

The deck 35 is supported in a horizontal position on the deck carrier 39 while the fore-end and rear-end portions 35b and 35c are gripped by the front and rear grip members 103, 107, respectively, of the deck reversing means 100. In the initial state as achieved at the deck loading station 41 (FIG. 1), the deck 35 is loaded on the deck carrier 39 with its front side facing upward. At the deck parts assembling station 43, deck parts or accessories are assembled on the front side of the deck 35 by a human operator 108. In this instance, since the front side of the deck 35 is facing upward, the human operator 108 can undertake the necessary part assembling operations without being forced to take difficult or uneasy positions. Then, the deck 35 is reversed with the agency of the deck reversing means 100. By thus reversing, the back side of the deck 35 is now facing upward. This arrangement again allows the human operation to assemble other deck parts or accessories onto the back side of the deck 35 without taking difficult or uneasy postures.

In the embodiment described above, the small planing watercraft manufacturing system 10 has a total of ten working stations (i.e., the hull loading station 14, first parts assembling station 16, engine mounting station 18, second parts assembling station 20, adhesive applying station 22, deck assembling station 24, clamping station 26, curing station 28, third parts assembling station 30 and watercraft unloading station 32) all disposed in the closed loop-shaped travel path 13. The number of stations is not limited to ten as in the illustrated embodiment but may be determined at option. Furthermore, the inspection area 90 may be disposed in the travel path 13.

Similarly, the number of working stations disposed in the second travel path 40 is not limited to three (i.e., the deck loading station 41, deck parts assembling station 43 and deck unloading station 45) as in the illustrated embodiment but may be determined at option. Furthermore, the adhesive applying apparatus 60 used in the adhesive applying station 22, the clamp tools 75 used in the clamping station 26, the curing units 80 used in the curing station 28 and the deck reversing means 100 incorporated in each deck carrier 39 are not limited to those described with respect to the illustrated embodiment but may be replaced by any other suitable apparatus.

Obviously, various minor changes and modifications are possible in the light of the above teaching. It is to be understood that within the scope of the appended claims the present invention may be practiced otherwise than as specifically described.

The present disclosure relates to the subject matter of Japanese Patent Application No. 2001-370391, filed Dec. 4, 2001, the disclosure of which is expressly incorporated herein by reference in its entirety.

What is claimed is:

1. A manufacturing system for small planing watercrafts, comprising:

a plurality of hull carriers;

a dosed loop-shaped travel path along which the hull carriers travel in succession;

a hull loading station for loading a hull on each of the hull carriers;

an engine mounting station for mounting an engine onto the hull;

an adhesive applying station for applying an adhesive to a bonding portion of the hull;

a deck assembling station for assembling a deck onto the hull such that a bonding portion of the deck comes face to face with the bonding portion of the hull;

a damping station for damping together the respective bonding portions of the hull and deck with the adhesive held therebetween;

a curing station for causing the adhesive to cure, with the bonding portions being kept damped, to thereby firmly join the bonding portions to form a complete small planing watercraft; and a watercraft unloading station for unloading the complete small planing watercraft from the hull carrier, wherein said bull loading station, engine mounting station, adhesive applying station, deck assembling station, clamping station, curing station and watercraft unloading station are disposed in the dosed loop-shaped travel path in the order named with the hull loading station and the watercraft unloading station located adjacent to each other.

2. The manufacturing system for small planing watercrafts, according to claim 1, further comprising:

a plurality of deck carriers;

a second dosed loop-shaped travel path along which the deck carriers travel in succession;

a deck loading station for loading a deck on each of the deck carriers;

a deck parts assembling station for assembling deck parts onto the deck; and a deck unloading station for unloading the deck from the deck carrier before the deck is assembled on the hull at the deck assembling station, wherein the deck loading station, parts assembling station and deck unloading station are disposed in the second dosed loop-shaped travel path in the order named with the deck unloading station located next to the deck assembling station.

3. The manufacturing system for small planing watercrafts, according to claim 2, wherein the curing station includes at least one pair of curing units disposed in direct opposite relation across the travel path for receiving a preassembled watercraft composed of the hull and the deck being damped together at the respective bonding portions, so as to cure the adhesive held between the bonding portions, and a turntable located on the travel path and disposed centrally between the pair of curing units for rotary motion through an angle of 90 degrees to ensure that the preassembled small planing watercraft is allowed to be supplied into or discharged from either one of the curing units.

4. The manufacturing system for small planing watercrafts, according to claim 3, wherein the curing units each include a generally U-shaped frame for accommodating therein a major part of the preassembled small planing watercraft with the watercraft carried on the hull carrier, a gate that can be opened and closed to allow the watercraft to be introduced into or discharged from the curing unit with a fore-end or a rear-end of the preassembled watercraft directed forward, and a hot air blower mounted on the frame and the gate for directing hot air onto the bonding potions of the hull and deck being clamped, so as to heat the adhesive to cure.

5. The manufacturing system for small planing watercrafts, according to claim 2, wherein the deck carrier includes a deck reversing means for reversing the deck while supporting the deck in a horizontal plane on the deck carrier.

6. The manufacturing system for small planing watercrafts, according to claim 5, wherein the deck carrier further includes two opposed vertical support members, and the deck reversing means comprises a first grip member for gripping a fore-end portion of the deck, and a second grip member for gripping a rear-end portion of the deck, the first and second grip members being rotatably mounted on the vertical support members such that they are rotatable about a common horizontal axis extending between the vertical support members.

7. The manufacturing system for small planing watercrafts, according to claim 2, further comprising: a transfer machine disposed between the deck unloading station and the deck assembling station for unloading the deck from the deck carrier at the deck unloading station, then moving the deck from the deck unloading station to the deck assembling station, and finally placing the deck on the hull carried on the hull carrier at the deck assembling station.

8. The manufacturing system for small planing watercrafts, according to claim 1, wherein the curing station includes at least one pair of curing units disposed in direct opposite relation across the travel path for receiving a preassembled watercraft composed of the hull and the deck being damped together at the respective bonding portions, so as to cure the adhesive held between the bonding portions, and a turntable located on the travel path and disposed centrally between the pair of curing units for rotary motion through an angle of 90 degrees to ensure that the preassembled small planing watercraft is allowed to be supplied into or discharged from either one of the curing units.

9. The manufacturing system for small planing watercrafts, according to claim 8, wherein the curing units each include a generally U-shaped frame for accommodating therein a major part of the preassembled small planing watercraft with the watercraft carried on the hull carrier, a gate that can be opened and closed to allow the watercraft to be introduced into or discharged from the curing unit with a fore-end or a rear-end of the preassembled watercraft directed forward, and a hot air blower mounted on the frame and the gate for directing hot air onto the bonding potions of the hull and deck being clamped, so as to heat the adhesive to cure.

* * * * *

UNITED STATES PATENT AND TRADEMARK OFFICE
CERTIFICATE OF CORRECTION

PATENT NO. : 6,813,827 B2
DATED : November 9, 2004
INVENTOR(S) : Masatoshi Murakami It is certified that error appears in the above-identified patent and that said Letters Patent is hereby corrected as shown below:

Column 12,
Lines 5, 30, 37 and 49, delete "dosed" and insert therefore -- closed --
Line 17, delete "damping" and insert therefore -- clamping --
Lines 22 and 57, delete "damped" and insert therefor -- clamped --
Line 27, delete "bull" and insert therefore -- hull --
Line 53, delete "claim 2" and insert therefore -- claim 1 --

Signed and Sealed this

Twenty-second Day of February, 2005

JON W. DUDAS
*Director of the United States Patent and Trademark Office*